(12) United States Patent
Kindler et al.

(10) Patent No.: US 7,006,560 B2
(45) Date of Patent: Feb. 28, 2006

(54) DIGITAL MODEM

(75) Inventors: Matthias Kindler, Neubiberg (DE); Mortiz Harteneck, München (DE); Axel Clausen, München (DE)

(73) Assignee: Infineon Technologies AG, Munich (DE)

( * ) Notice: Subject to any disclaimer, the term of this patent is extended or adjusted under 35 U.S.C. 154(b) by 1015 days.

(21) Appl. No.: 09/954,390

(22) Filed: Sep. 14, 2001

(65) Prior Publication Data

US 2002/0067764 A1 Jun. 6, 2002

(30) Foreign Application Priority Data

Sep. 20, 2000 (DE) ........................................ 100 46 637

(51) Int. Cl.
*H04B 1/38* (2006.01)
*H04L 23/00* (2006.01)

(52) U.S. Cl. ...................................................... 375/222
(58) Field of Classification Search ................ 375/285, 375/254, 222, 354; 370/282, 231, 335, 342, 370/441; 455/80, 88; 379/406, 405
See application file for complete search history.

(56) References Cited

U.S. PATENT DOCUMENTS

| | | | | |
|---|---|---|---|---|
| 4,748,689 A | * | 5/1988 | Mohr | ......................... 455/612 |
| 5,671,253 A | | 9/1997 | Stewart | |
| 5,793,413 A | * | 8/1998 | Hylton et al. | ................. 348/12 |
| 5,886,989 A | | 3/1999 | Evans et al. | |

FOREIGN PATENT DOCUMENTS

EP 0 825 772 2/1998

OTHER PUBLICATIONS

Von Guido Schwarzfeld, "Perspektiven fur Anwender," Funkschau, pp. 43–45, (Mar. 2000).*
European Telecommunications Standards Institute, "Digital Video Broadcasting (DVB); Interaction channel for Cable TV distribution systems (CATV)," European Broadcasting Union, pp. 1–83, (Jul. 1998).*

* cited by examiner

*Primary Examiner*—Mohammed Ghayour
*Assistant Examiner*—Dung X Nguyen
(74) *Attorney, Agent, or Firm*—Jenkins, Wilson & Taylor, P.A.

(57) ABSTRACT

Digital modem for data exchange between a data distribution unit (2) and at least one receiver (3, 4) which can be connected to the digital modem (1) with:
a user-data forward signal path (17) for the transmission of user data from the television-data distribution unit (2) to the receiver (3, 4) over broadband user-data forward transmission channels,
a backward signal path (42) for the transmission of television-receiver control data from the receiver (3, 4) to the data distribution unit (2) over narrowband backward transmission channels;
and with a control-data forward signal path (27) for the transmission of narrowband control data or user data from the data distribution unit (2) to the receiver (3, 4) over narrowband forward transmission channels,
it additionally being possible for broadband user data to be transmitted over the control-data forward signal path (27) from the data distribution unit (2) to the receiver (3, 4).

10 Claims, 4 Drawing Sheets

DIGITAL MODEM

TECHNICAL FIELD

The invention relates to a digital modem for data exchange between a data distribution unit and at least one television receiver which can be connected to the digital modem.

RELATED ART

EP 0825772 A2 describes a data transmission system with a digital multimedia terminal which contains an adjustable receiver for the reception of control signals. Connected as a receiver to the terminal is a computer. A distribution unit sends user data via a transmitter over broadband user-data forward transmission channels to a receiver inside the multimedia terminal. In addition, the multimedia terminal has a transmission unit for the transmission of receiver data from the receiver to the distribution unit. An adjustable receiver inside the multimedia terminal serves for the reception of Control data, which are transmitted from the data distribution unit to the receiver over forward transmission channels. The data transmission unit contains a control block, which controls the necessary number of user-data forward signal paths by controlling the transmission unit in such a way that it uses identical overhead bits in the data frame and identical R bytes in the SL-ESF user data. This achieves the effect that additional user data can be transmitted from the data distribution unit to the receiver over the control-data forward signal path between the control data transmission unit and the control data receiver.

The DVB signal transmission standard (DVB: Digital Video Broadcasting) describes new digital data distribution services, which are transmitted via a transmission link from a television data distribution unit (head end) to a receiver connected to at least one modem. The signal transmission link may be a satellite link, a broadband cable or a radio transmission link. The DVB standard provides two forward signal paths, to be specific a broadband user-data signal path for the transmission of user data from the data distribution unit to the receiver over broadband user-data transmission channels and a narrowband control-data signal path for the transmission of control data from the data distribution unit to the receiver connected to the modem over narrowband control-data transmission channels.

FIG. 1 shows a possible frequency spectrum according to the DVB cable standard. The user-data channels are used for transmitting the user data from the data distribution unit to the receiver. The user-data channels have a frequency bandwidth of 8 MHz, which allows a data transmission of 56 Mbits per second. Since, in the case of a standard MPEG data stream for a television channel, approximately 8 Mbits per second are sent, it is possible for example for a number of television channels to be transmitted within one broadband data channel. The narrowband control-data channels are used for transmitting the control data or user data from the data distribution unit via the data transmission link. The control-data channels have a smaller frequency bandwidth than the user-data channels, for example 1 MHz or 2 MHz. To make an interactive service possible in future, backward channels for the transmission of data from the receiver to the data distribution unit are provided in the DVB standard. The backward channels are likewise relatively narrowband channels and have a frequency bandwidth of 0.165 MHz or 4 MHz.

FIG. 2 shows the two signal paths in the case of a prior-art digital modem constructed in a way corresponding to the DVB standard. The conventional digital modem shown in FIG. 2 has a user-data forward signal path for receiving the QAM-modulated user data and a control-data forward signal path for receiving the QPSK-modulated control data or user data.

The user-data signal path has an analog input stage for the signal conditioning of the QAM-modulated user data, which is connected on the output side to a QAM demodulator for the demodulation of the QAM-modulated user data. Connected downstream of the QAM demodulator is a user-data decoding circuit for the decoding of the demodulated user data. The decoded user data are fed to a MAC control circuit (MAC: Media Access Control).

The control-data signal path likewise has an analog input stage for the reception and signal conditioning of the QPSK-modulated control data. The QPSK-modulated control data are demodulated in a downstream QPSK demodulator. The demodulated control data are subsequently decoded by a control-data decoding circuit and likewise sent to the MAC control circuit.

The conventional digital modem shown in FIG. 2, which is constructed according to the DVB standard, has the disadvantage that it has only one broadband user-data forward path. This means that the digital modem can only transmit one broadband user-data stream, for example video and sound data, to a connected receiver. In many applications, however, the transmission of two broadband user-data streams through the digital modem is necessary. Examples of much applications are picture-in-picture representations, in which the television viewer has the possibility of viewing a further television picture within the picture being viewed, in order for example to decide whether or not he should switch over to the other television channel. Another application is the viewing of a first television channel and simultaneous recording of a second television channel by a recording device.

It has therefore been proposed to provide in addition to the broadband user-data forward path for the transmission of the QAM-modulated user data a further broadband user-data forward path of an identical construction. Since this additional user-data forward path likewise has an own analog input stage, a downstream QAM demodulator and an own user-data decoding circuit, the expenditure on circuitry for a digital modem of this type with two broadband user-data forward paths and a control-date forward path is very high.

SUMMARY OF THE INVENTION

It is therefore the object of the present invention to provide a digital modem for data exchange between a data distribution unit and at least one receiver which can be connected to the digital modem in which two broadband user-data streams can be transmitted from the data distribution unit to the receiver and which at the same time can be realized with very little expenditure on circuitry.

This object is achieved according to the invention by a digital modem with the features specified in patent claim 1.

The invention provides a digital modem for data exchange between a data distribution unit and at least one receiver which can be connected to the digital modem with
a user-data forward signal path for the transmission of user data from the data distribution unit to the receiver over broadband user-data forward transmission channels,
a backward signal path for the transmission of control data or user data from the receiver to the data distribution unit over narrowband backward transmission channels and with
a control-data forward signal path for the transmission of control data from the television data distribution unit to the receiver over narrowband forward transmission channels,
it additionally being possible for user data to be transmitted over the control-data forward signal path from the television data distribution unit to the television receiver, the control-data forward signal path containing an analog receiving circuit for the reception and signal conditioning of QPSK-modulated control data and QAM-modulated user data via a data transmission link, and
a QAM/QPSK demodulator, which in a first operating mode demodulates the QPSK-modulated control data and in a second operating mode demodulates the QAM-modulated user data, the QAM/QPSK demodulator sending the demodulated data to a control-data decoder for the decoding of the demodulated control data and to a user-data decoder, connected in parallel with said control-data decoder, for the decoding of the demodulated user data.

The basic idea of the present invention is to construct the already existing control-data forward signal path for the transmission of control data in such a way that it is also suitable for the transmission of broadband user data from the data distribution unit to the receiver. This makes the provision of an additional independent user-data forward signal path superfluous, so that the digital modem according to the invention can be realized with relatively little expenditure on circuitry.

The circuitry used for realizing the control-data forward signal path which is suitable both for the transmission of the QPSK-demodulated control data and the QAM-modulated user data exploits the fact that the QPSK modulation constitutes a special case of QAM modulation. The QPSX modulation corresponds to a 4-QAM modulation, so that the control-data forward signal path can use a QAM/QPSK demodulator, which operates either as a QAM demodulator or as a QPSK demodulator.

In a particularly preferred embodiment, the QAM/QPSK demodulator can be switched over between the first operating mode and the second operating mode.

The QAM/QPSK demodulator, which is contained in the control-data forward signal path, preferably has a synchronizing circuit for the synchronization to the received modulated analog data signal and an equalizer circuit The user-data forward signal path preferably likewise contains an analog receiving circuit for the reception and signal conditioning of the QAM-modulated user data transmitted by the data distribution unit, a QAM demodulator for the demodulation of the CAM-modulated user data and also a decoding circuit for the decoding of the demodulated user data.

In a particularly preferred embodiment of the digital modem according to the invention, the backward signal path has a coding circuit for the coding of data which is sent from the receiver,
a modulator for the modulation of the coded data and an analog output circuit for the signal conditioning and sending of the modulated data to the television data distribution unit via the data transmission signal link.

The digital modem according to the invention is preferably a digital DVB modem.

The data transmission link is preferably a broadband signal cable, a satellite transmission link or a radio signal transmission link.

The control-data decoder of the control-data forward signal path preferably has a signal output, which is connected to a MAC control circuit.

The user-data decoder of the control-data forward signal path preferably likewise has a signal output, which is connected to the MAC control circuit and is connected to an MPEG output terminal.

BRIEF DESCRIPTION OF THE DRAWINGS

Preferred embodiments of the digital modem according to the invention are described below with reference to the attached figures to explain features essential for the invention.

In the figures.

DETAILED DESCRIPTION OF THE INVENTION

Figure 1:
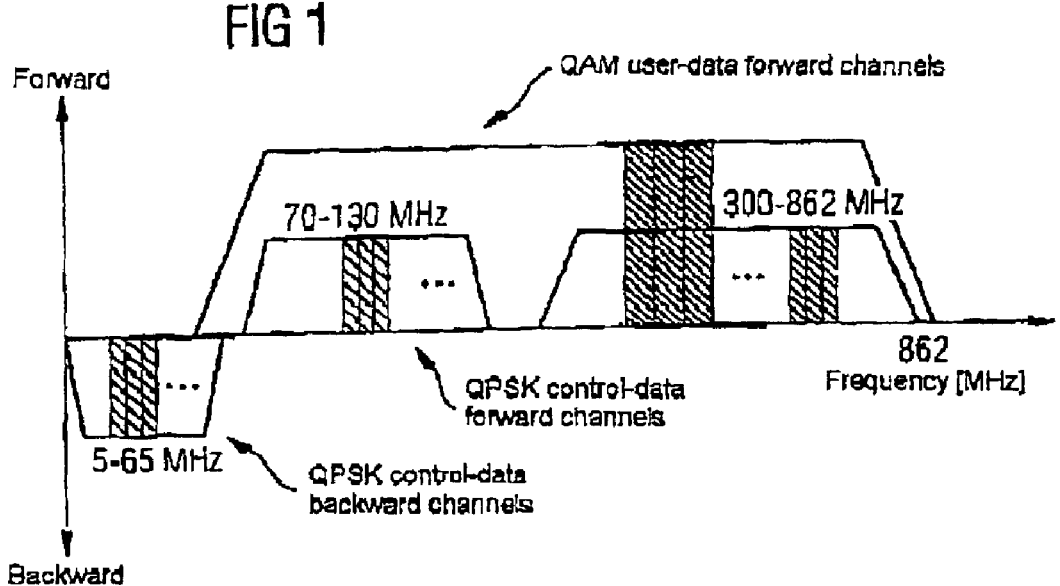
FIG. 1 shows a frequency spectrum to represent the data transmission channels corresponding to the DVE standard.
Figure 2:
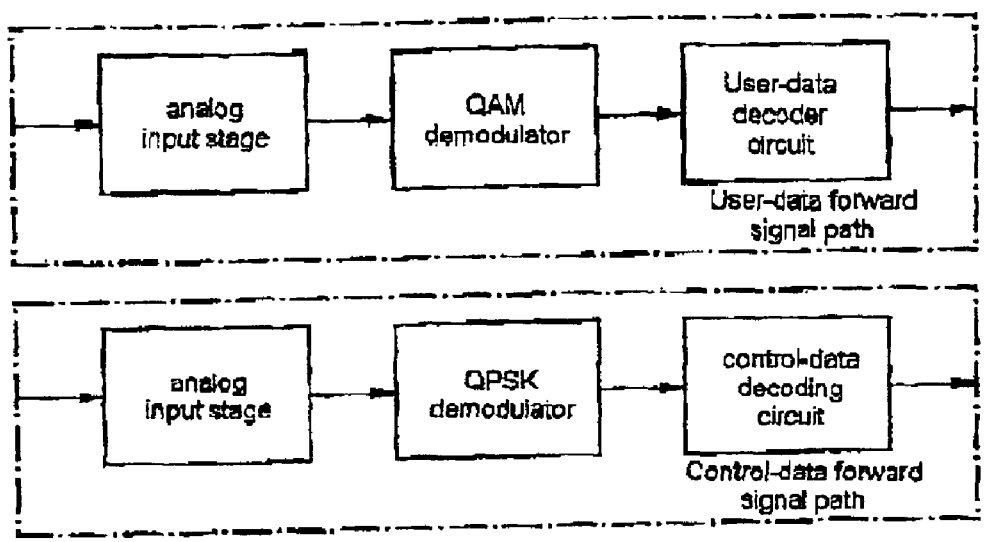
FIG. 2 shows the user-data forward signal path and the control-data forward signal path in the case of a conventional digital modem which is constructed in a way corresponding to the DVB standard.
Figure 3:
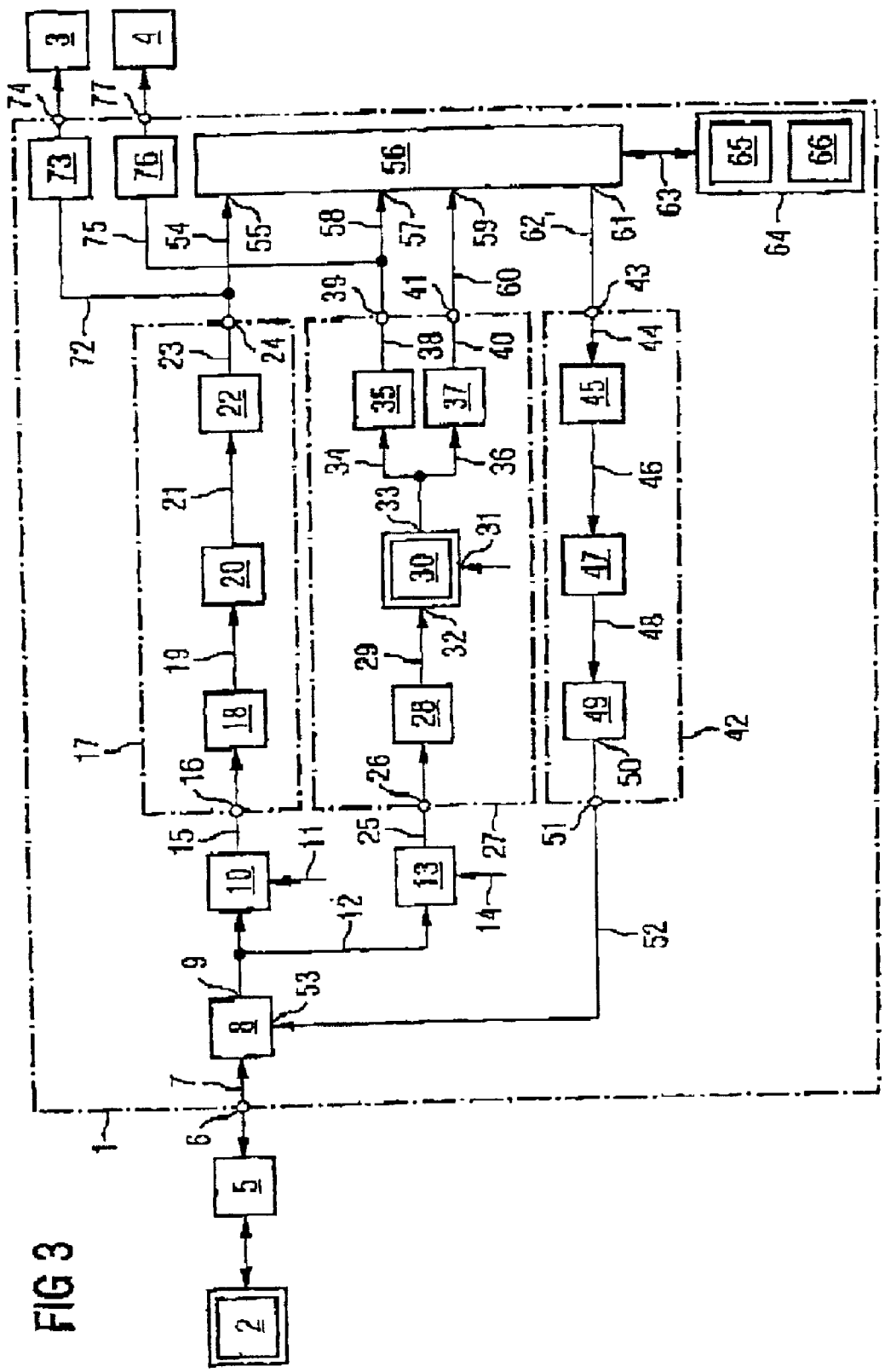
FIG. 3 shows a block diagram of a preferred embodiment of the digital modem according to the invention.

FIG. 3 shows a preferred embodiment of the digital modem 1 according to the invention for data exchange between a data distribution unit 2 and two receivers 3, 4, in particular television receivers, connected to the digital modem 1. The data distribution unit 2 sends user and control data to a signal terminal 6 of the digital modem 1 via a data transmission link 5. The signal terminal 6 is used by the digital modem 1 for its part to send control data originating from the connected receivers 3, 4 to the data distribution unit 2, so that interactive services are possible.

The signal terminal 6 of the digital modem 1 is connected via a signal line 7 to a diplex filter 8 for the separation of the forward signal paths and the backward signal path. The diplex filter 8 sends the received analog signals over a signal line 9 to a first tuner 10, which can be controlled via a control line 11 for channel selection. The diplex filter 8 sends the received analog signals over a line 12 to a second tuner 13, which can be controlled via a control line 14 for channel selection.

The first tuner 10 is connected via a signal line 15 to a signal input 16 of a user-data forward signal path 17. The user-data forward signal path 17 serves for the transmission of user data from the data distribution unit 2 to the receivers 3, 4 over broadband user-data forward transmission channels. The user-data forward signal path or inband signal path 17 contains an analog receiving circuit 18 for the reception of the transmitted QAM-modulated user data, a QAM demodulator 20, connected downstream via a line 19, for the demodulation of the QAM-modulated user data, and a decoding circuit 22, connected in series via a line 21, for the decoding of the demodulated user data. The decoding circuit 22 is connected via a line 23 to a signal output 24 of the user-data signal forward path 16.

The second tuner 13 is connected via a signal line 25 to a signal input 26 of a control-data forward signal path 27 The control-data forward signal path 27 has an analog receiving circuit 28, which is provided for the signal conditioning and the reception of QPSK-modulated control data and QAM-modulated user data. The analog receiving circuit 28 is connected on the output side via a signal line 29 to a QAM/QPSK demodulator 30, which in a first operating mode demodulates the QPSK-modulated control data and in a second operating mode demodulates the QAM-modulated user data For this purpose, the QAM/OPSK demodulator can preferably be switched over between the two operating modes via a control line 31. The QAM/QPSK demodulator has a signal input 32 and a signal output 33, the signal output 33 being connected via a first signal line 34 to a user-data decoder 35 and via a signal line 36 to a control-data decoder 37. The user-data decoder 35 decodes the user data demodulated by the QAM/QPSK demodulator. The control-data decoder 37 decodes the control data sent by the QAM/QPSK demodulator 30. The user-data decoder 35 is connected via a line 38 to a first signal output 39 of the control-data forward signal path 27. The control-data decoder 37 is connected via a line 40 to a second signal output 42 of the control-data forward signal path 27. The control-data forward signal path 27 serves for the transmission of control data or narrowband user data from the data transmission unit 2 to a MAC control circuit 56 over narrowband control-data forward transmission channels. In this case, the control-data forward signal path 27 is additionally suitable for transmitting broadband user data from the data transmission unit 2 to the two receivers 3, 4, so that two broadband user-data streams can flow simultaneously through the digital modem 1.

Apart from the user-data forward signal path 17 and the control-data forward signal path 27, the digital modem 1 according to the invention additionally has a backward signal path 42, the backward signal path 42 has a signal input 43, for the reception of data originating from the receivers of the MAC control circuit 56. The signal input 43 of the backward signal path 42 is connected via a line 44 to a coding circuit 45 for the coding of the data transmitted by the receivers 3, 4. The coding circuit 45 is connected on the output side via a line 46 to a QPSK modulator 47, which QPSK-modulates the received coded data and sends the data modulated in this way via a line 48 to an analog output circuit 49. The analog output circuit 49 is connected via a line 50 to a signal output 51 of the backward signal path 42. The signal output 51 is arm connected via a signal line 52 to an input 53 of the diplex filter 8 for the separation of the two forward signal paths 17, 27 from the backward signal path 42.

The signal output 24 of the user-data forward signal path 17 is connected via a signal line 54 to a first signal input 55 of a MAC control circuit 56, for example a DVB-MAC control circuit. The SC control circuit 56 has a second signal input 57, which is connected via a signal line 58 to the first signal output 39 of the control-data forward signal path 27. The second signal input 57 of the MAC control circuit 56 receives via the signal line 58 the user data decoded by the user-data decoder 35. The MAC control circuit 56 has a third signal input 59, which receives via a signal line 60 the control data decoded by the control-data decoder 37. The MAC control circuit 56 has, moreover, a signal output 61, which sends data to the backward signal path via a line 62.

The MAC control circuit 56 is connected via control lines 63 to a central controller 64 of the digital modem 1. Apart from a microprocessor, the central control circuit 64 contains a memory 65 and a flash memory 66.

The signal output 24 of the user-data forward signal path 17 is also connected via a signal line 72 to an MPEG demultiplexing and decoding circuit 73, which sends the received user data in an MPEG data format via a terminal 74 to the receiver 3. The user data is, for example, video and audio data.

The user-data signal output 39 of the control-data forward signal path 27 is connected via a signal line 75 to a further MPEG demultiplexing and decoding circuit 76. The MPEG demultiplexing and decoding circuit 76 sends the user data received via the control-data forward signal path via a terminal 77 to the further receiver 4.

The digital modem 1 according to the invention, as it is represented in FIG. 3, is capable of transmitting two user-data streams simultaneously from the data distribution unit 2 to downstream terminal devices 3, 4. The first user-data stream flows via the user-data forward signal path 17 and the MPEG demultiplexing and decoding circuit 73 to the terminal 74, and the second user-data stream flows via the control-data forward signal path 27 and the MPEG demultiplexing and decoding circuit 76 to the terminal 77.

The tuning of the tuners 10, 13 via the control lines 11, 14 and the switching over of the QAM/QPSK demodulator between the two operating modes via the control line 31 takes place in accordance with control signals which are sent by the central modem controller 64. The transmitted user data are 16 QAM, 32 QAM, 64 QAM, 128 QAM or 256 QAM signals.

Figure 4:
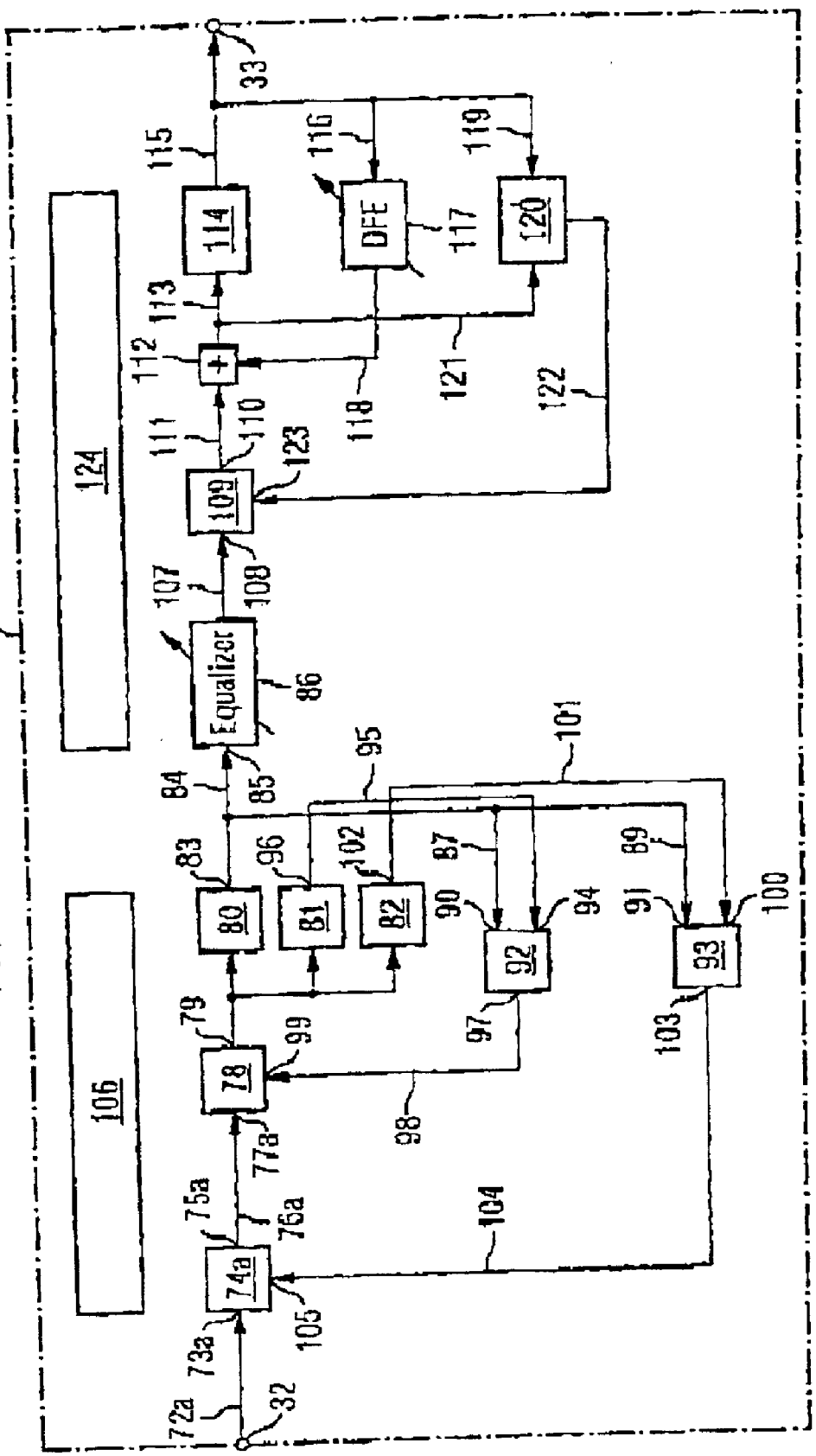
FIG. 4 :shows a block diagram of the QAM/QPSK demodulator contained in the control-data forward signal path.

FIG. 4 shows a block diagram of the QAM/QPSK demodulator 30 represented in FIG. 3. The data signal originating from the analog input stage, which is QPSK-modulated control data or QAM-modulated user data, is fed to the signal input 32 of the QAM/QPSK demodulator 30 and passes via an internal signal line 72a to a first control input 734 of a mixer 74a, which mixes the received data signal down into the baseband. The signal output 75a of the mixer 74a is connected via a line 76a to an output 77a of a resampling unit 78, which adapts the chip clock rate to the received data rate. The resampling unit 7B is connected via an output 79 to parallel-connected filter units 80, 81, 82. The filter unit 80 is preferably an RRC filter (RRC: Root Raised Cosine), the output 83 of which is connected via a line 84 to an input 85 of a downstream equalizer 86 for equalization. The signal output 83 of the RRC filter 80 is connected via lines 87, 89 to inputs 90, 91 of two estimated-value calculation devices 92, 93. The first estimated-value calculation device 92 has a further signal input 94, which receives via a line 95 a filtered signal from an output 96 of the second filter device 81. The estimated-value calculation unit 92 calculates an estimated value for the data rate of the received data signal and sends this estimated value via a signal output 97 and a line 98 to a control input 99 of the resampling unit 78.

The second estimated-value calculating unit 93 has a second signal input 100, which receives via a line 101 a filtered signal from a signal output 102 of the third filter unit 82. The estimated-value calculation unit 93 calculates from the received filtered signals an estimated value for the carrier frequency of the received data signal and sends the calculated estimated value at a signal output 103 via a signal line 104 to a second input 105 of the mixer 74a. The mixing stage 74a, the resampling unit 79, the parallel-connected filter units 80, 81, 82 and the estimated-value calculation units 92, 93 form a demodulation stage of the QAM/QPSK filter for the demodulation of the QPSK-modulated control signals and the QAM-modulated user-data signals, the demodulation stage being controlled by a demodulation sequence controller 106.

The demodulated data signal is freed of distortions in the equalizer 86 and passes via a signal line 107 to a first input 108 of a phase rotation unit 109. The phase rotation unit 109 has a signal output 110, which is connected via a line 111 to an addition circuit 112. The addition circuit 112 is connected on the output side via a line 113 to a decision circuit or a slicer 114, which is connected on the output side via a line 115 of the QAM/QPSK demodulator 30. The signal present at the output 33 of the QAM/QPSK demodulator passes via a signal line 116 into an adjustable DFE equalizer 117 (DFE: Decision Feedback Equalizer), the output signal of which is fed via a line 118 to the addition circuit 112.

The signal present at the output 33 of the QAM/QPSK demodulator 30 is fed via a line 119 to a phase estimated-value calculation unit 120, which is connected via a further input and via a line 121 to the output of the addition circuit 112. The phase estimated-value calculation unit 120 calculates an estimated value for the signal phase of the received signal and sends a corresponding setting signal via a signal line 122 to a setting terminal 123 of the phase rotation unit 109. An equalizer sequence controller 124 carries out a sequence control for controlling the signal processing operations.

Figure 5:
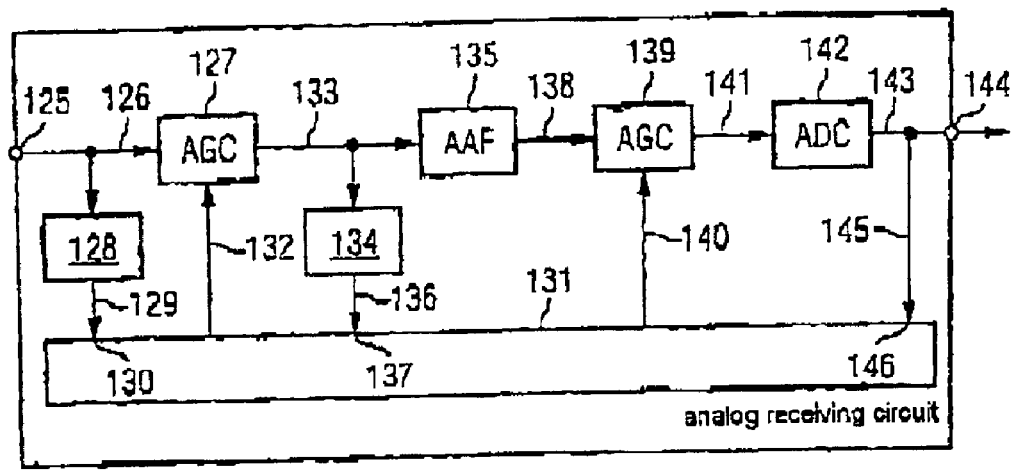
FIG. 5 shows a block diagram of an analog input stage.

FIG. 5 shows a block diagram of an analog input stage as it is installed in the user-data forward signal path 17 and the control-data forward signal path 27 as an analog input stage 18 and 28, respectively. The analog receiving circuit has a signal input 125, which is connected via signal input lines 126 to a gain control circuit 127 and a peak-value detector 128. The peak-value detector 128 is connected on the output side via a signal line 129 to a signal input 130 of a control circuit 131 of the analog input stage. The analog control circuit 131 controls the gain control circuit 127 via a control line 132. The gain control circuit 127 is connected on the output side via signal lines 133 to a further peak-value detector 134 and an anti-aliasing filter 135. The second peak-value detector 134 is connected on the output side via a signal line 136 to a second signal input 131 of the control circuit 131. The anti-aliasing filter 135 is connected via a line 138 to a further gain control circuit 139, which is driven via a control line 140 by the control circuit 131. The gain control circuit 139 is connected via a line 141 to an analog/digital converter 142 for the conversion of the analog signal into a digital output signal. The signal output of the analog/digital converter 142 is connected via a signal line 143 to an output terminal 144 of the analog receiving circuit, the digital output signal of the analog/digital converter 142 being additionally fed via a signal line 145 to a further signal input 146 of the control circuit 131.

Figure 6:
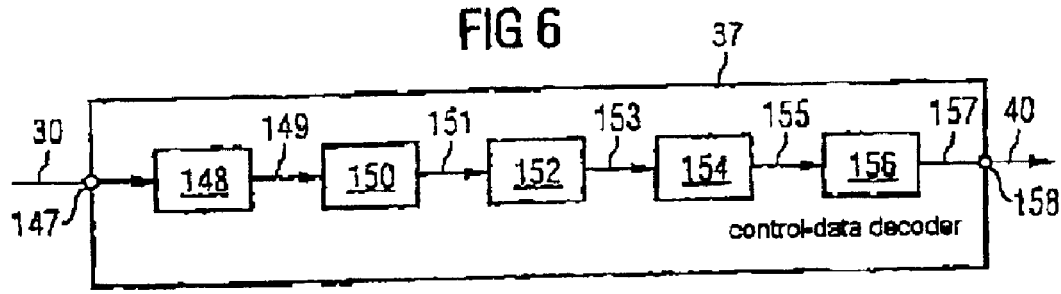
FIG. 6 shows a block diagram of a control-data decoder, as used in the control-data forward signal path.

FIG. 6 shows a block diagram of the control-data decoder 37 contained in the control-data forward signal path. The control-data decoder 37 serves for the decoding of the QPSK data demodulated by the QAM/QPSK demodulator. The data pass via a signal input 147 of the control-data decoder to a differential decoder 148, which maps the data bits onto symbols. The differential decoder 148 is connected via a line 149 to a derandomizer 150, which is connected on the output side via a line 151 to a deframing unit 152, which extracts the control data. The extracted control data are fed to the MAC control unit 56. The deframing unit 152 is connected on the output side via a line 153 to a descrambler or deinterleaver 154. The deinterleaver 154 is connected via a line 155 to a Reed-Solomon decoder 156, the signal output of which is connected via a line 157 to a signal output 158 of the control-data decoder 37.

Figure 7:
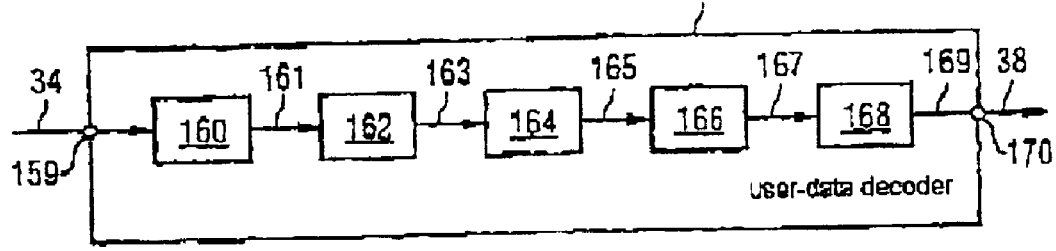
FIG. 7 shows a block diagram of a user-data decoder, as used in the control-data forward signal path.

FIG. 7 shows a block diagram of the user-data decoder 35 contained in the control-data forward signal path 27. The user-data decoder 35 receives via a signal input 159 the user-data signal sent via the line 34 from the QAM/QPSK demodulator, said signal being fed to a differential decoder 160. The differential decoder 160 carries out a mapping of the received data bits onto user-data symbols and sends these via a signal line 161 to a descrambler or deinterleaver 162. The deinterleaver 162 is connected on the output side via a line 163 to a Reed-Solomon decoder 164 for error correction. The Reed-Solomon decoder sends the error-corrected data via a line 165 to a derandomizer unit 166. The derandomizer unit 166 is connected on the output side via a line 167 to an output interface 168 of the user-data decoder 35. The output interface 168 is connected via a line 169 to an output terminal 170 of the user-data decoder 35.

What is claimed is:

1. A digital modem for data exchange between a distribution unit and at least one receiver which can be connected to the digital modem with:
   a user-data forward signal path for a transmission of broadband user data from the data distribution unit to the receiver over broadband user-data forward transmission channels,
   a backward signal path for the transmission of receiver data from the receiver to the data distribution unit over narrowband backward transmission channels;

and with a control-data forward signal path for the transmission of control data and narrowband user data from the data distribution unit to the receiver over narrowband forward transmission channels, broadband user data additionally being transmitted over the control-data forward signal path from the data distribution unit to the receiver.

2. The digital modem as claimed in claim 1, wherein the control-data forward signal path has an analog input stage for the reception of quadrature phase shift keying (QPSK)-modulated narrowband control data or narrowband user data and quadrature amplitude modulation (QAM)-modulated broadband user data via a data transmission link and a QAM/QPSK demodulator, which in a first operating mode demodulates the QPSK-modulated narrowband control data or narrowband user data and in a second operating mode demodulates the QAM-modulated broadband user data and sends the demodulated data to a control-data decoder for the decoding of the demodulated narrowband control and user data and to a user-data decoder, connected in parallel with said control-data decoder, for the decoding of the demodulated broadband user data.

3. The digital modem as claimed in claim 2, wherein the QAM/QPSK demodulator can be switched over between the first operating mode and the second operating mode.

4. The digital modem as claimed in claim 2, wherein the QAM/QPSK demodulator has a synchronizing circuit for the synchronization to the received demodulated analog data signal and an echo-compensation circuit.

5. The digital modem as claimed in claim 2, wherein the user-data forward signal path has an analog receiving circuit for the reception of the QAM-modulated user data transmitted from the data distribution unit via a data transmission link, a QAM demodulator for the demodulation of the QAM-modulated user data, and a decoding circuit for the decoding of the demodulated user data.

6. The digital modem as claimed in claim 1, wherein the backward signal path has a coding circuit for the coding of the receiver data transmitted from the receiver, a QPSK modulator for the QPSK modulation of the coded receiver data, and an analog output circuit for the sending of the QPSK-modulated receiver data to the data distribution unit via the data transmission link.

7. The digital modem as claimed in claim 1, wherein the digital modem is a digital DVB modem.

8. The digital modem as claimed in claim 2, wherein the data transmission link is a broadband signal cable, a satellite transmission link or a radio signal transmission link.

9. The digital modem as claimed in claim 2, wherein the control data decoder of the control-data forward signal path has an output terminal, which is connected to a MAC control circuit.

10. The digital modem as claimed in claim 9, wherein the user data decoder of the control-data forward signal path has a signal output terminal, which is connected to the MAC control circuit and is connected to a receiver terminal.

* * * * *